(12) United States Patent
Sakanoue et al.

(10) Patent No.: US 9,654,031 B2
(45) Date of Patent: May 16, 2017

(54) POWER SYSTEM, POWER CONVERTER CONTROLLING APPARATUS, AND ELECTRIC VEHICLE HAVING THE POWER SYSTEM

(71) Applicants: CENTRAL JAPAN RAILWAY COMPANY, Nagoya-shi, Aichi (JP); FUJI ELECTRIC CO., LTD., Kawasaki-shi, Kanagawa (JP)

(72) Inventors: Kei Sakanoue, Kiyose (JP); Hirokazu Kato, Funabashi (JP); Hiroki Shimoyama, Nagoya (JP); Tomotaka Nishijima, Kobe (JP); Junichi Ishii, Kobe (JP); Yasushi Matsumoto, Hino (JP); Toshie Kikuchi, Kokubunji (JP)

(73) Assignees: CENTRAL JAPAN RAILWAY COMPANY, Nagoya-Shi, Aichi (JP); FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/177,338

(22) Filed: Jun. 8, 2016

(65) Prior Publication Data
US 2016/0285395 A1    Sep. 29, 2016

Related U.S. Application Data

(63) Continuation of application No. PCT/JP2014/076560, filed on Oct. 3, 2014.

(30) Foreign Application Priority Data

Dec. 20, 2013    (JP) .................................. 2013-263143

(51) Int. Cl.
H02P 5/46    (2006.01)
H02P 5/74    (2006.01)
(Continued)

(52) U.S. Cl.
CPC .............. *H02P 5/74* (2013.01); *B60L 3/0061* (2013.01); *B60L 3/12* (2013.01); *B60L 11/1803* (2013.01);
(Continued)

(58) Field of Classification Search
CPC ...... H02P 1/54; H02P 5/00; H02P 5/46; H02P 21/00; H02P 6/00; H02P 1/42; H02P 1/26; H02P 1/46
(Continued)

(56) References Cited

U.S. PATENT DOCUMENTS 5,825,150 A   10/1998   Kachi et al.
6,140,789 A   10/2000   Kachi et al.
(Continued)

FOREIGN PATENT DOCUMENTS

JP   H03-265487 A   11/1991
JP   H09-16233 A    1/1997
(Continued)

*Primary Examiner* — Antony M Paul
(74) *Attorney, Agent, or Firm* — Rabin & Berdo, P.C.

(57) ABSTRACT

A controlling apparatus includes a storage unit for storing, for each sampling period, a combination of a primary frequency of connected induction motors and the amplitude of a voltage command value, and a gradient detection unit for calculating a value corresponding to an increase in the amplitude of the voltage command value divided by an increase in the primary frequency, and for outputting a failure signal upon determining, when a result of the division is less than a predetermined reference value, that the plurality of induction motors include at least one induction motor having a phase sequence that includes incorrect wiring with respect to the power converter.

11 Claims, 10 Drawing Sheets

(51) Int. Cl.
*B60L 3/00* (2006.01)
*B60L 3/12* (2006.01)
*B60L 11/18* (2006.01)
*B60L 15/00* (2006.01)
*B60W 20/00* (2016.01)
*H02M 1/32* (2007.01)
*H02M 7/5387* (2007.01)
*H02P 5/747* (2006.01)

(52) U.S. Cl.
CPC ........... *B60L 15/007* (2013.01); *B60W 20/00* (2013.01); *H02M 1/32* (2013.01); *H02M 7/53873* (2013.01); *B60L 2210/30* (2013.01); *B60L 2210/40* (2013.01); *B60L 2220/12* (2013.01); *B60L 2240/421* (2013.01); *B60L 2240/423* (2013.01); *B60L 2240/427* (2013.01); *B60L 2240/429* (2013.01); *B60L 2240/526* (2013.01); *B60L 2240/527* (2013.01); *B60L 2240/529* (2013.01); *H02P 5/747* (2013.01); *Y02T 10/644* (2013.01); *Y02T 10/645* (2013.01); *Y02T 10/648* (2013.01); *Y02T 10/7005* (2013.01); *Y02T 10/7241* (2013.01)

(58) Field of Classification Search
USPC ............. 318/34, 37, 38, 49, 400.01, 400.02, 318/400.14, 400.15, 606, 625, 607, 700, 318/701, 721, 727, 779, 799, 800, 801, 318/430, 432, 437; 388/800, 819, 821; 701/94; 73/23.26; 363/21.1, 40, 44, 95, 363/120, 174, 175
See application file for complete search history.

(56) References Cited

U.S. PATENT DOCUMENTS

| | | | |
|---|---|---|---|
| 6,232,737 | B1 | 5/2001 | Kachi et al. |
| 9,488,687 | B2 * | 11/2016 | Matsumura .......... G01R 31/041 |
| 2014/0097859 | A1 | 4/2014 | Matsumura et al. |

FOREIGN PATENT DOCUMENTS

| | | |
|---|---|---|
| JP | 2000-032616 A | 1/2000 |
| JP | 2007-318955 A | 12/2007 |
| JP | 2008-253008 A | 10/2008 |
| JP | 2009-005478 A | 1/2009 |
| JP | 2010-213557 A | 9/2010 |
| JP | 2014-023282 A | 2/2014 |
| JP | 2014-230467 A | 12/2014 |
| WO | WO-2012/172647 A1 | 12/2012 |

\* cited by examiner $L_s = l_s + M$ : PRIMARY INDUCTANCE
$L_r = l_r + M$ : SECONDARY INDUCTANCE
M : EXCITATION INDUCTANCE
$R_s$ : PRIMARY RESISTOR, $R_r$ : SECONDARY RESISTOR

POWER SYSTEM, POWER CONVERTER CONTROLLING APPARATUS, AND ELECTRIC VEHICLE HAVING THE POWER SYSTEM

CROSS REFERENCE TO RELATED APPLICATIONS

This application is based upon and claims the benefit of priority of the prior Japanese Patent Application No. 2013-263143, filed on Dec. 20, 2013, the entire contents of which are incorporated herein by reference.

This is a Continuation Application of PCT Application No. PCT/JP2014/076560 filed on Oct. 3, 2014, which was not published under PCT Article 21(2) in English.

FIELD

The present invention relates to a controlling apparatus for a power converter that includes a function to detect incorrect wiring of the phase sequence of at least one of a plurality of induction motors, and to an electric vehicle that includes the controlling apparatus, wherein the controlling apparatus is used in a system for driving the plurality of induction motors using one power converter and for testing or analyzing the plurality of induction motors.

BACKGROUND

FIG. 6 is a block diagram illustrating a controlling apparatus for a three-phase synchronous motor that includes an incorrect wiring detecting function. In FIG. 6, a torque command generation unit 1 calculates a torque command value $T_{CMD}$ from a deviation between a velocity command value $V_c$ and a feedback velocity signal $V_{cF}$. A current command generation unit 2 calculates, according to the torque command value $T_{CMD}$, a q-axis current command value $I_{qC}$ and a d-axis current command value $I_{dC}$, which are input to an armature current supplying apparatus 3.

The armature current supplying apparatus 3 includes a power converter 3e, such as an inverter, from which three-phase output voltage is supplied to a synchronous motor M. The synchronous motor M has an encoder 6 attached thereto, and a rotor position signal $\theta_m$ is input to a feedback velocity signal generation unit 7 so as to generate the feedback velocity signal $V_{cF}$.

A current detector 4 is provided on the input side of the synchronous motor M, and current signals $I_u$ and $I_v$ of a U phase and V phase detected by the current detector 4 are input to an orthogonal two-axis transformation unit 5. Using a SIN signal and COS signal generated by a signal generator (OSC) 9 according to the rotor position signal $\theta_m$, the orthogonal two-axis transformation unit 5 converts the current signals $I_u$ and $I_v$ into a d-axis current feedback signal $I_{dF}$ and a q-axis current feedback signal $I_{qF}$.

In the armature current supplying apparatus 3, current controllers 3a and 3b calculate a q-axis voltage command value $V_{qC}$ and a d-axis voltage command value $V_{dC}$ for eliminating a deviation between the current command value $I_{qC}$ and the feedback signal $I_{qF}$ and a deviation between the current command value $I_{dC}$ and the feedback signal $I_{dF}$. The voltage command values $V_{qC}$ and $V_{dC}$ are input to a coordinate converter 3c.

Using the SIN signal and the COS signal, the coordinate converter 3c converts the voltage command values $V_{qC}$ and $V_{dC}$ into a three-phase voltage command value $V_{UC}$, $V_{VC}$, $V_{WC}$, and supplies the three-phase voltage value to a PWM controller 3d.

The PWM controller 3d PWM-controls the power converter 3e using a drive signal generated from the voltage command value $V_{UC}$, $V_{VC}$, $V_{WC}$ and drives the synchronous motor M by converting a DC voltage into a three-phase AC voltage.

In FIG. 6, an incorrect wiring detection unit 8 is provided that detects incorrect two-phase wiring or incorrect three-phase wiring of the phase sequence of the synchronous motor M with respect to an output phase of the power converter 3e. In the presence of incorrect two-phase wiring or incorrect three-phase wiring, the q-axis current command value $I_{qC}$ is in a saturated state, the q-axis current feedback signal $I_{qF}$ becomes a predetermined value or higher, and the polarities of the q-axis current feedback signal $I_{qF}$ and feedback velocity signal $V_{cF}$ are reversed. By paying attention to these, the incorrect wiring detection unit 8 detects incorrect wiring and outputs an alarm signal AS.

As depicted in FIG. 7, the incorrect wiring detection unit 8 consists of a saturated state determination unit 8a, a q-axis current feedback signal determination unit 8b, an integration unit 8c, and a determination unit 8d.

With reference to FIGS. 7 and 8, the following will describe an operation of detecting two-phase incorrect wiring of a phase sequence performed by the incorrect wiring detection unit 8 (e.g., a situation in which an input phase of the synchronous motor M is connected in a phase sequence of U-W-V to an output phase U-V-W of the power converter 3e).

The saturated state determination unit 8a determines that the q-axis current command value $I_{qC}$ has been put in a saturated state as depicted in FIG. 8B, and outputs the determination result to the integration unit 8c. The q-axis current feedback signal determination unit 8b determines that the q-axis current feedback signal $I_{qF}$ is a predetermined value or higher, and outputs the determination result to the integration unit 8c. At a moment at which the q-axis current feedback signal $I_{qF}$ is determined to have a positive polarity, the integration unit 8c starts to integrate, as depicted in FIGS. 8A, 8C, a period of time of a negative polarity of the feedback velocity signal $V_{cF}$ that oscillates without following the velocity command $V_c$, and outputs the integrated period as an integrated value IV. As depicted in FIGS. 8C, 8D, at a moment at which the integrated value IV reaches a cumulative time RT, the determination unit 8d outputs an alarm signal AS for reporting incorrect wiring.

However, in a case where a plurality of induction motors connected in parallel to each other and mechanically coupled to each other are driven by one power converter, even if a phase sequence of one motor includes incorrect wiring, the motor in the wrong-wiring state will be driven due to the influence of output torque of the motors with correct wiring. As a result, a load velocity becomes adjustable in conformity with a command value. Accordingly, a prior art relying on velocity and/or velocity command values is inapplicable to a plurality of induction motors.

Existing methods do not include a method of detecting incorrect wiring to be used when a plurality of motors are driven by a power converter, and are incapable of solving a problem that occurs when a plurality of motors include one with incorrect wiring, as described above.

SUMMARY

Accordingly, an object of the present invention is to provide a controlling apparatus for a power converter capable of detecting that a phase sequence of at least one of a plurality of induction motors connected in parallel to each other and mechanically coupled to each other includes incorrect wiring, and an electric vehicle equipped with the controlling apparatus.

According to one embodiment of the invention, a controlling apparatus for a power converter that operates a plurality of induction motors connected in parallel to each other and mechanically coupled to each other by supplying to the induction motors a three-phase AC voltage obtained by converting a DC voltage through an operation of a semiconductor switching element includes a current detection unit configured to detect an output current of the power converter; current control unit configured to generate a voltage command value to make a current detection value provided by the current detection unit equal to a current command value; voltage command amplitude calculation unit configured to calculate an amplitude of the voltage command value; storage unit configured to store, for each sampling period, a combination of a primary frequency of the induction motors and the amplitude of the voltage command value at that time; and; gradient detection unit configured to calculate, according to stored information from the storage unit, a value that is an increase in the amplitude of the voltage command value that is divided by an increase in the primary frequency, and configured to output a failure signal upon determining, when a result of the division is less than a predetermined reference value, that the plurality of induction motors include at least one induction motor whose phase sequence includes incorrect wiring with respect to the power converter.

According to one embodiment, the controlling apparatus includes a current detection unit configured to detect an output current of the power converter; a voltage detection unit configured to detect an output voltage of the power converter; a current control unit configured to generate a voltage command value to make a current detection value provided by the current detection unit equal to a current command value; voltage detection value amplitude calculation unit configured to calculate an amplitude of a voltage detection value provided by the voltage detection unit; a storage unit configured to store, for each sampling period, a combination of a primary frequency of the induction motors and the amplitude of the voltage command value at that time; and a gradient detection unit configured to calculate, according to stored information from the storage unit, a value that is an increase in the amplitude of the voltage command value that is divided by an increase in the primary frequency, and configured to output a failure signal upon determining, when a result of the division is less than a predetermined reference value, that the plurality of induction motors include at least one induction motor whose phase sequence includes incorrect wiring with respect to the power converter.

Embodiments of the invention further include a power system having a plurality of induction motors and a DC power supply. A power converter is configured to convert power from the DC power supply into a three-phase AC voltage, and to supply the three-phase AC voltage to the plurality of induction motors. The power system includes a power converter controlling apparatus including a current detection unit configured to detect an output current of the power converter, and a current control unit configured to generate a voltage command value based on a current detection value provided by the current detection unit and based on a current command value corresponding to a target current value. The power converter controlling apparatus further includes an amplitude detection unit configured to detect an amplitude value of one of the voltage command value and a voltage output from the power converter, and a gradient detection unit configured to calculate a value corresponding to an increase in the amplitude value divided by an increase in a primary frequency of the plurality of wheel-driving induction motors, and configured to output a failure signal upon determining that a result of the division is less than a predetermined reference value.

DESCRIPTION OF EMBODIMENTS

The following will describe embodiments of the invention with reference to the drawings.

Figure 1A:
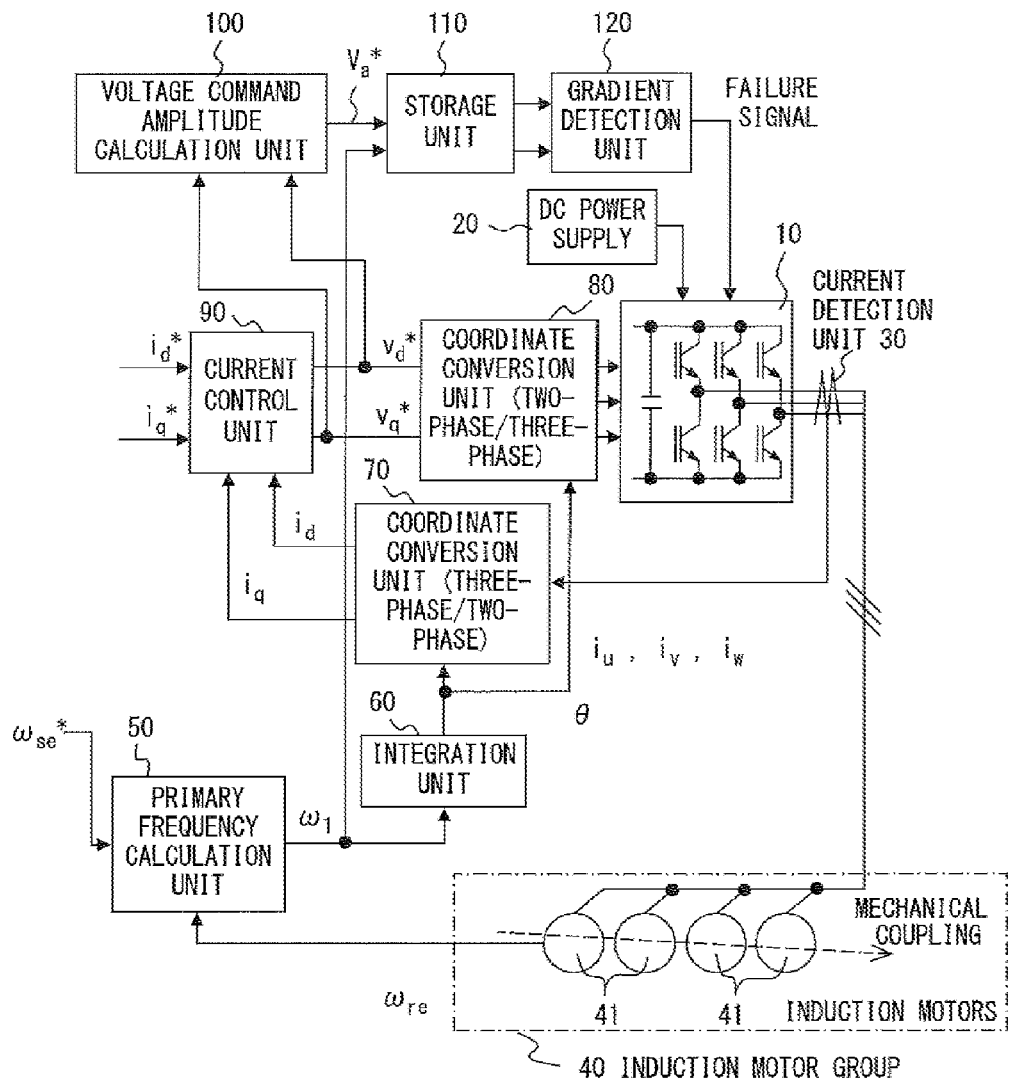
FIG. 1A is a block diagram illustrating a drive system for an induction motor to which an embodiment of the invention is applied.

FIG. 1A illustrates a drive system for an induction motor to which an embodiment of the invention is applied. In FIG. 1A, a DC power supply 20 is connected to a power converter 10 such as an inverter, a DC voltage of the DC power supply 20 is converted into a three-phase AC voltage through operations of a semiconductor switching element within the power converter 10, and the three-phase AC voltage is supplied to an induction motor group 40.

The induction motor group 40 consists of a plurality of (e.g., four) induction motors 41 connected in parallel to each other and mechanically coupled to each other.

A control apparatus for the power converter 10 is configured as follows.

In particular, primary frequency calculation unit 50 sums a slip frequency (slip angular frequency) command value $\omega_{se}^*$ and a rotational velocity detection value $\omega_{re}$ of the induction motor group 40, and a primary frequency (primary angular frequency) $\omega_1$ is generated. The primary frequency $\omega_1$ is integrated by integration unit 60 so as to calculate an angle θ required for vector control, and is also input to storage unit 110.

Current detection unit 30 is provided on an output side of the power converter 10. A three-phase current detection value $i_u$, $i_v$, $i_w$ is input to coordinate conversion unit 70. According to the angle θ, the coordinate conversion unit 70 converts the current detection value $i_u$, $i_v$, $i_w$ into a d-axis current detection value $i_d$ and a q-axis current detection value $i_q$, which are a two phase value, and outputs these values to current control unit 90.

The current control unit 90 calculates and outputs a d-axis voltage command value $V_d^*$ and q-axis voltage command value $V_q^*$ for making the d-axis current detection value $i_d$ equal to a d-axis current command value $i_d^*$ and for making the q-axis current detection value $i_q$ equal to a q-axis current command value $i_q^*$. The d-axis current command value $i_d^*$ and the q-axis current command value $i_q^*$ are supplied from a host controller (not illustrated).

Coordinate conversion unit 80 converts, according to the angle θ, the d-axis voltage command value $V_d^*$ and the q-axis voltage command value $V_q^*$ into a three-phase voltage command value and supplies this value to the power converter 10. Through a switching operation of a semiconductor switching element, the power converter 10 generates and supplies a three-phase AC voltage conforming to the voltage command value to the induction motor group 40.

The d-axis voltage command value $V_d^*$ and q-axis voltage command value $V_q^*$ output from the current control unit 90 are also input to voltage command amplitude calculation unit 100. The voltage command amplitude calculation unit 100 calculates an amplitude $v_a^*$ of the voltage command value in accordance with formula 1, and causes the storage unit 110 to store this amplitude.

$$v_a^* = \sqrt{v_d^{*2} + v_q^{*2}} \quad \text{Formula 1}$$

The storage unit 110 stores the primary frequency $\omega_1$ and the amplitude $v_a^*$ of the voltage command value, both of which have been sampled at certain intervals. For example, the storage unit 110 may store a combination of $\omega_1(k)$ and $v_a^*(k)$, where $\omega_1(k)$ indicates a primary frequency obtained in a k-th sampling interval, and $v_a^*(k)$ indicates the amplitude of the voltage command value.

Using $\omega_1(k)$ and $v_a^*(k)$, i.e., the newly obtained data obtained in the k-th interval, and $\omega_1(k-1)$ and $v_a^*(k-1)$, i.e., previous data, gradient detection unit 120 determines the ratio of an increase in the amplitude of the voltage command value relative to an increase in the primary frequency ($\Delta v_a^*/\Delta \omega_1$) in accordance with formula 2.

$$\frac{\Delta v_a^*}{\Delta \omega_1} = \frac{v_a^*(k) - v_a^*(k-1)}{\omega_1(k) - \omega_1(k-1)} \quad \text{Formula 2}$$

When the ratio ($\Delta v_a^*/\Delta \omega_1$) is less than a predetermined reference value, the gradient detection unit 120 detects that the phase sequence of at least one induction motor 41 of the induction motor group 40 includes incorrect two-phase wiring with respect to an output phase of the power converter 10. The fact that a phase sequence of the induction motor group 40 includes incorrect two-phase wiring with respect to an output phase of the power converter 10 unit, for example, that an input phase of an induction motor 41 is connected to an output phase U-V-W of the power converter 10 in a phase sequence of U-W-V. When the gradient detection unit 120 detects that a phase sequence of at least one induction motor 41 includes incorrect two-phase wiring with respect to an output phase of the power converter 10, the gradient detection unit 120 generates and outputs a failure signal to the power converter 10. Upon receipt of the failure signal, the power converter 10 stops power supply to the induction motor group 40 by turning off all semiconductor switching elements (all gates are put in an off state).

Next, with reference to the configuration depicted in FIG. 1A, descriptions will be given of the reason why incorrect two-phase wiring of an induction motor 41 can be detected.

In vector control of an induction motor, an analysis is made using a coordinate system that rotates at an output frequency (primary frequency) of a power converter (d-q axis coordinate system). Accordingly, an induction motor having an incorrect phase sequence of an input phase caused by two phases of a three-phase output of a power converter including incorrect wiring is analyzed on the assumption that a rotor side is equivalently rotating backward. In this case, when the polarity of a primary frequency $\omega_1$ of the induction motor is defined as positive, the polarity of a rotational velocity $\omega_{re}$ is negative, and the polarity of a slip frequency is positive. Formula 3 expresses a relationship between $\omega_{se2}$, $\omega_{re}$, and $\omega_1$, where $\omega_{se2}$ indicates a slip frequency of the induction motor with incorrect wiring, thereby clarifying that the slip frequency $\omega_{se2}$ is about twice the rotational velocity $\omega_{re}$.

$$\omega_{se2} = \omega_{re} + \omega_1 \quad \text{Formula 3}$$

Figure 2:
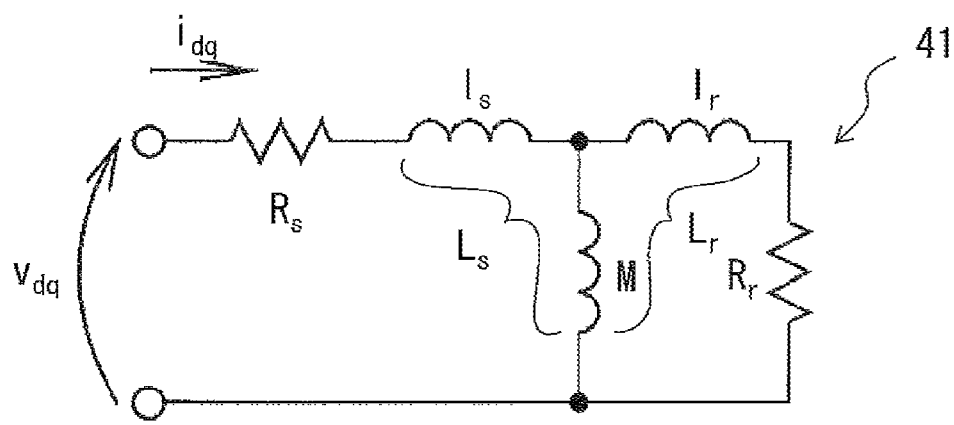
FIG. 2 illustrates a T-shaped equivalent circuit of an induction motor.

FIG. 2 illustrates a T-shaped equivalent circuit of an induction motor 41. The T-shaped equivalent circuit is represented by a primary resistor $R_s$, a primary-side leakage inductance $L_s$, a secondary-side leakage inductance $L_r$, an excitation inductance M, and a secondary resistor $R_r$. As illustrated, a d-axis voltage $v_d$ and a q-axis voltage $V_q$ (represented as $V_{dq}$ in the figure) from a power converter can be considered to be applied to the induction motor 41 and the voltages can be considered to cause a d-axis current $i_d$ and a q-axis current $i_q$ (represented as $i_{dq}$ in the figure) to flow into the circuit.

Figure 3:
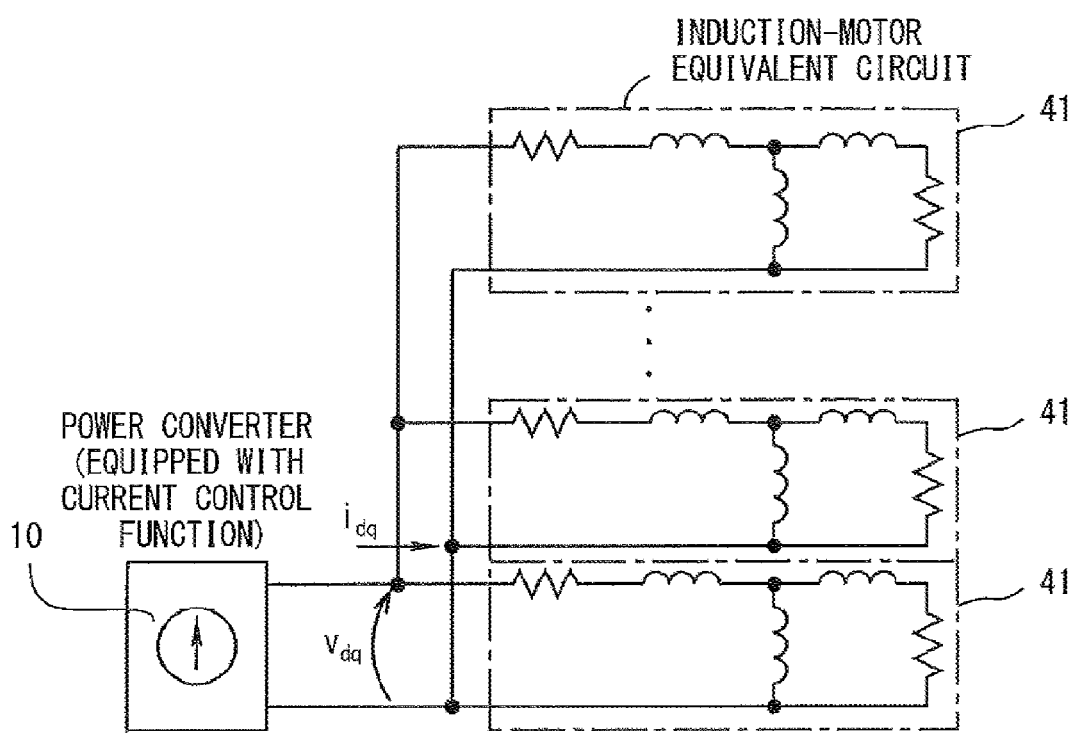
FIG. 3 illustrates an equivalent circuit with a plurality of induction motors connected in parallel.

Meanwhile, FIG. 3 illustrates an equivalent circuit with a plurality of induction motors 41 connected in parallel to each other, as in FIG. 1A.

Formula 4 expresses a voltage expression of an induction motor 41 in a complex vector format.

$$v_{dq} = R_a i_{dq} + \frac{d}{dt}\left(\sigma L_s i_{dq} + \frac{M}{L_r}\phi_{dq}\right) + j\omega_1 \sigma L_s i_{dq} + j\omega_1 \frac{M}{L_r}\phi_{dq} \quad \text{Formula 4}$$

In formula 4, $v_{dq}$ indicates an applied voltage from the power converter 10; $\phi_{dq}$, a secondary magnetic flux vector; $i_{dq}$, a current vector; $\omega_1$, a primary frequency; $\sigma L_s$, a leakage inductance (which is essentially equal to $M/L_r$ ($L_s + L_r$)).

Formula 5 expresses a relationship between the dq-axis current $i_{dq}$ and inducted voltage $e_{dq}$ on a primary side, where $e_{dq}$ indicates an inducted voltage generated by the secondary magnetic flux $\phi_{dq}$ with voltage drops at the primary resistor $R_s$ and the leakage inductance $\sigma L_s$ subtracted from the applied voltage $v_{dq}$. In formula 5, a derivative term is ignored, and a steady state is taken into consideration.

$$e_{dq} = j\omega_1 \frac{M}{L_r}\phi_{dq} = \frac{M}{L_r}\frac{\omega_1 \omega_{se} + j\omega_1 R_r/L_r}{R_r^2 + \omega_{se}^2}i_{dq} \quad \text{Formula 5}$$

Formula 5 expresses a relationship between the primary current $i_{dq}$ and the inducted voltage $e_{dq}$. An impedance Z of a secondary side of the induction motor may be obtained by dividing both sides of formula 5 by the primary current $i_{dq}$.

Figure 4:
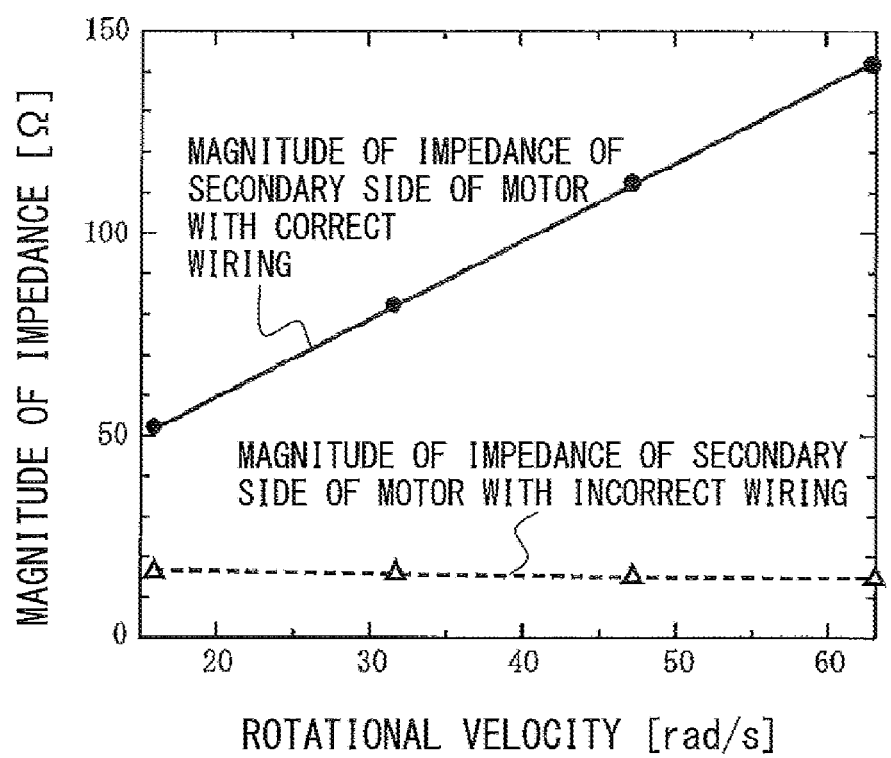
FIG. 4 illustrates a comparison in an example calculation of the magnitude of a secondary side impedance between an induction motor in a correct wiring state and the induction motor in an incorrect wiring state.

FIG. 4 illustrates, under a condition in which the primary frequency has increased to 2.5 [Hz]-10 [Hz] (corresponding to a rotational velocity of 16 [rad/s]-63 [rad/s] of the induction motor), exemplary calculation of the magnitudes of respective secondary side impedances Z of one induction motor with correct wiring and an induction motor with an incorrect wiring in a phase sequence. A rated voltage of 200 [V] and a rated output of 7.5 [kW], i.e., constants of an induction motor for vector control, are used as motor constants.

In the induction motor with incorrect wiring in a phase sequence, a sum of the rotational velocity and the primary frequency is a slip frequency, as expressed by formula 3 described above. That is, when the slip frequency is fixed, the primary frequency decreases with an increase in the rotational velocity, and hence the secondary side impedance Z determined by formula 5 remains a low value even when the rotational velocity increases, as illustrated in FIG. 4.

Figure 5:
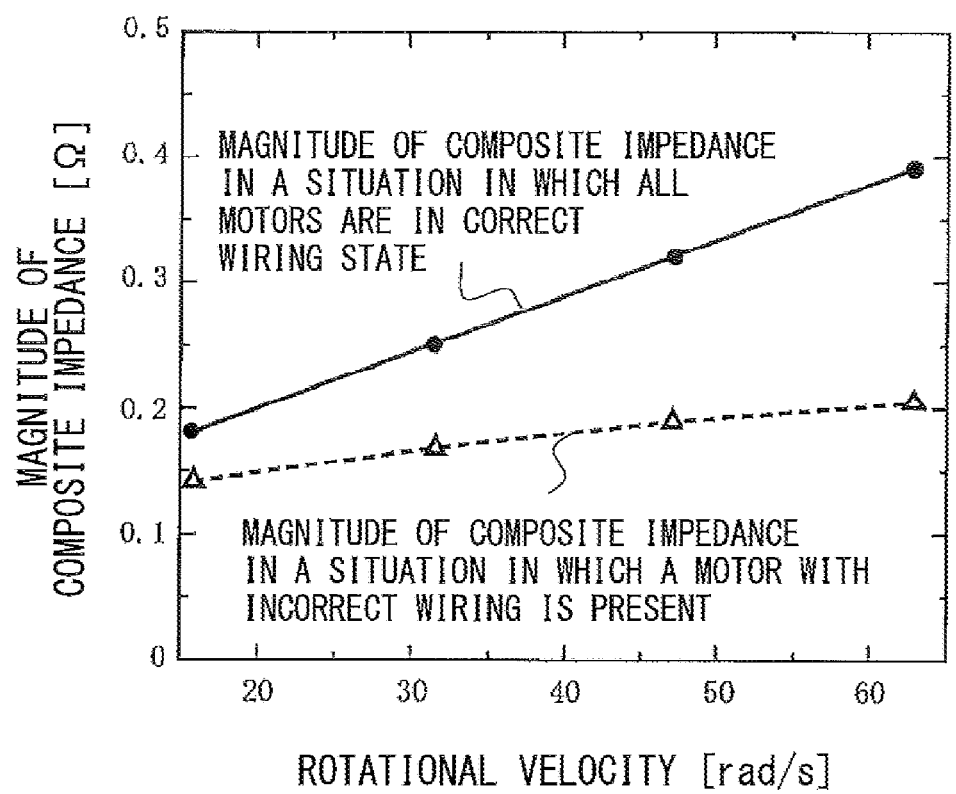
FIG. 5 illustrates a comparison in exemplary calculation of the magnitude of a composite impedance of a plurality of induction motors between the plurality of induction motors in a correct wiring state and the plurality of induction motors in an incorrect wiring state.
Figure 6:
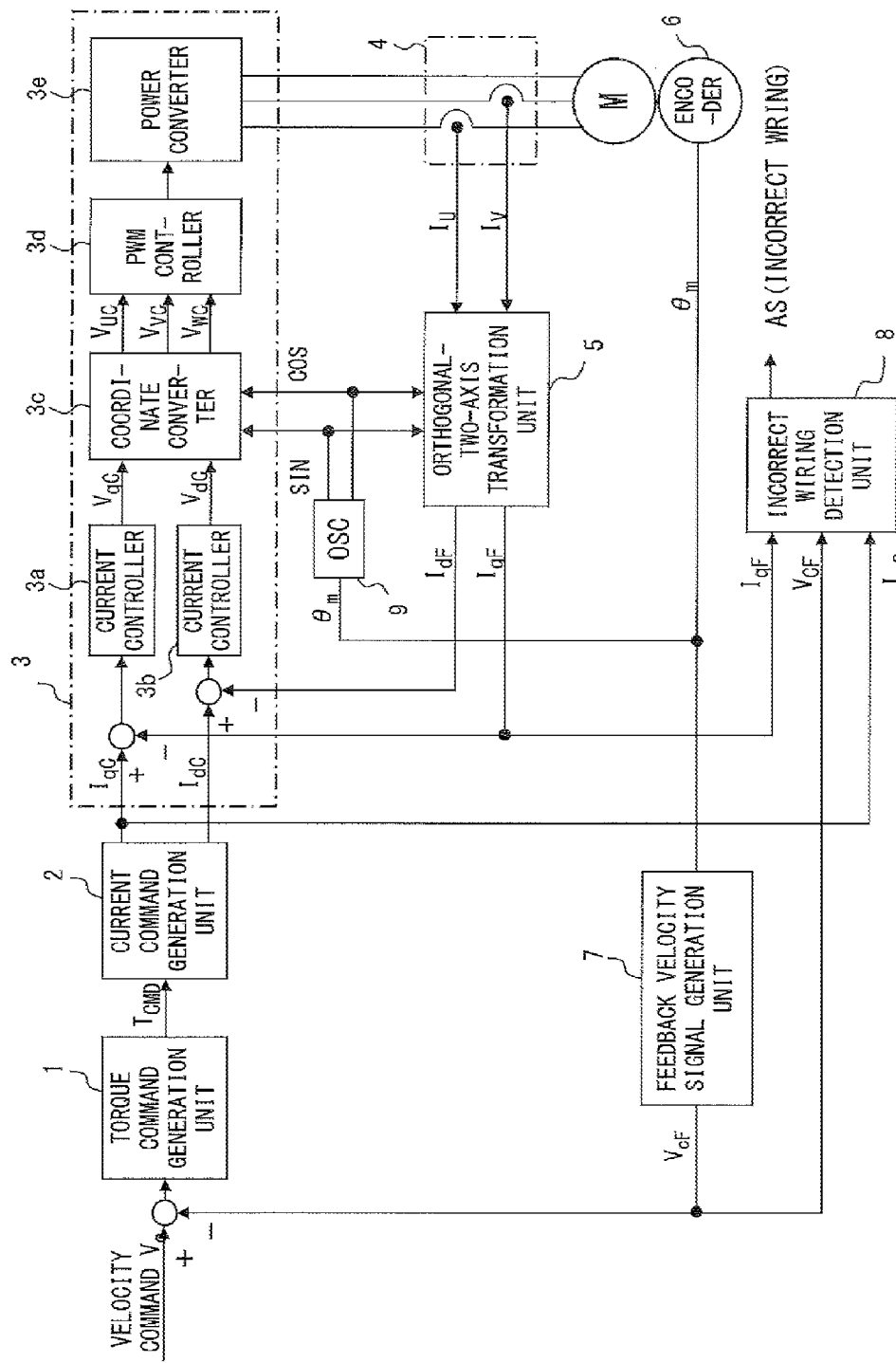
FIG. 6 is a block diagram of a control system for controlling.
Figure 7:
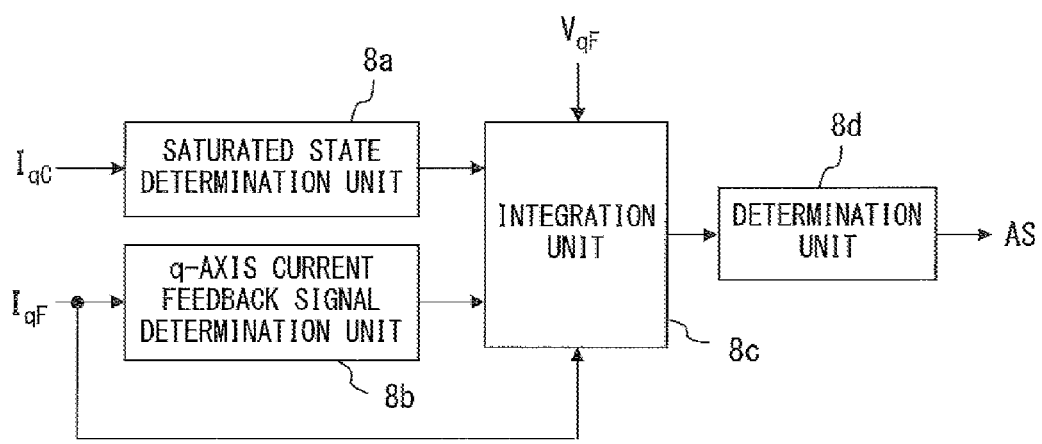
FIG. 7 is a block diagram illustrating the configuration of an incorrect wiring detection unit in FIG. 6.
Figure 8A:
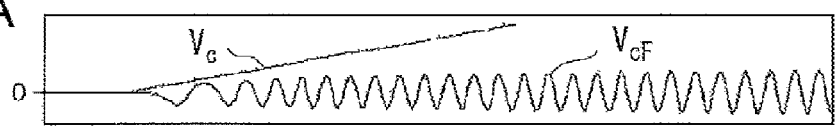
FIGS. 8A, 8B, 8C, 8D are an operation explanatory diagram of the incorrect wiring detection unit in FIG. 6.
Figure 8B:
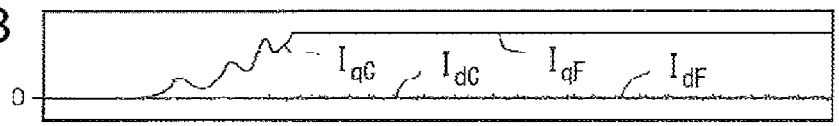
Figure 8C:
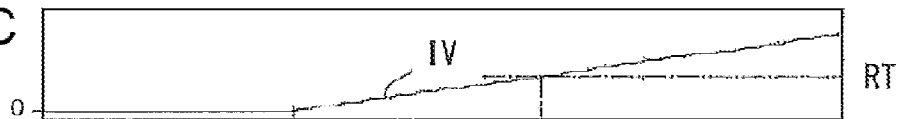
Figure 8D:
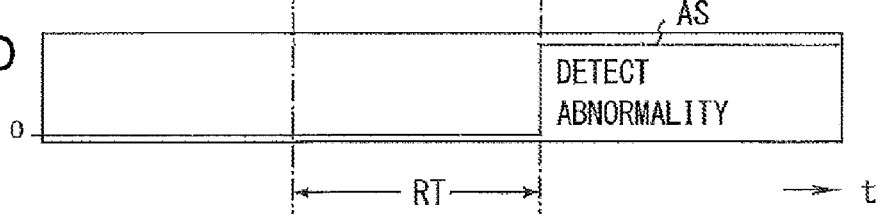

In regard to the magnitude of the composite impedance of the entirety of the induction motor, the secondary side impedance becomes dominant with an increase in the primary frequency. FIG. 5 depicts a result of calculation of a composite impedance for a situation in which a plurality of (e.g., four) induction motors, connected in parallel to each other, are all in a correct wiring state with a correct phase sequence, and a result of calculation of a composite impedance for a situation in which the phase sequence of one of a plurality of induction motors is in an incorrect two-phase wiring state.

According to FIG. 5, in comparison with a situation in which all induction motors are in a correct wiring state, when an induction motor includes incorrect wiring, including an induction motor with incorrect wiring leads to a decreased slope of the composite impedance relative to the rotational velocity.

Meanwhile, the control apparatus for the power converter 10 performs current control and thus serves as a current source for a plurality of induction motors 41, as depicted in FIG. 3. Hence, when a current based on the same current command value flows through each induction motor 41, a voltage with an amplitude that is proportional to the magnitude of the composite impedance corresponding to either of the situations depicted in FIG. 5 will emerge at an output of the power converter 10.

Accordingly, the storage unit 110 stores the primary frequency $\omega_1$ and an amplitude $v_a^*$ of the voltage command value, as depicted in FIG. 1A. The gradient detection unit 120 detects the ratio ($\Delta v_a^*/\Delta\omega_1$) of an increase in the amplitude $v_a^*$ of the voltage command value relative to an increase in the primary frequency $\omega_1$ (increase in the rotational velocity) in accordance with formula 2. According to the fact that the ratio has become less than a predetermined reference value, i.e., the fact that the degree of a change in composite impedance relative to the rotational velocity has become less than a predetermined reference value, incorrect wiring of the phase sequence of at least one induction motor 41 may be detected.

As described above, when incorrect wiring of an induction motor 41 is detected, a failure signal may be output from the gradient detection unit 120 so as to perform an operation such as stopping the operation of the power converter 10.

Figure 1B:
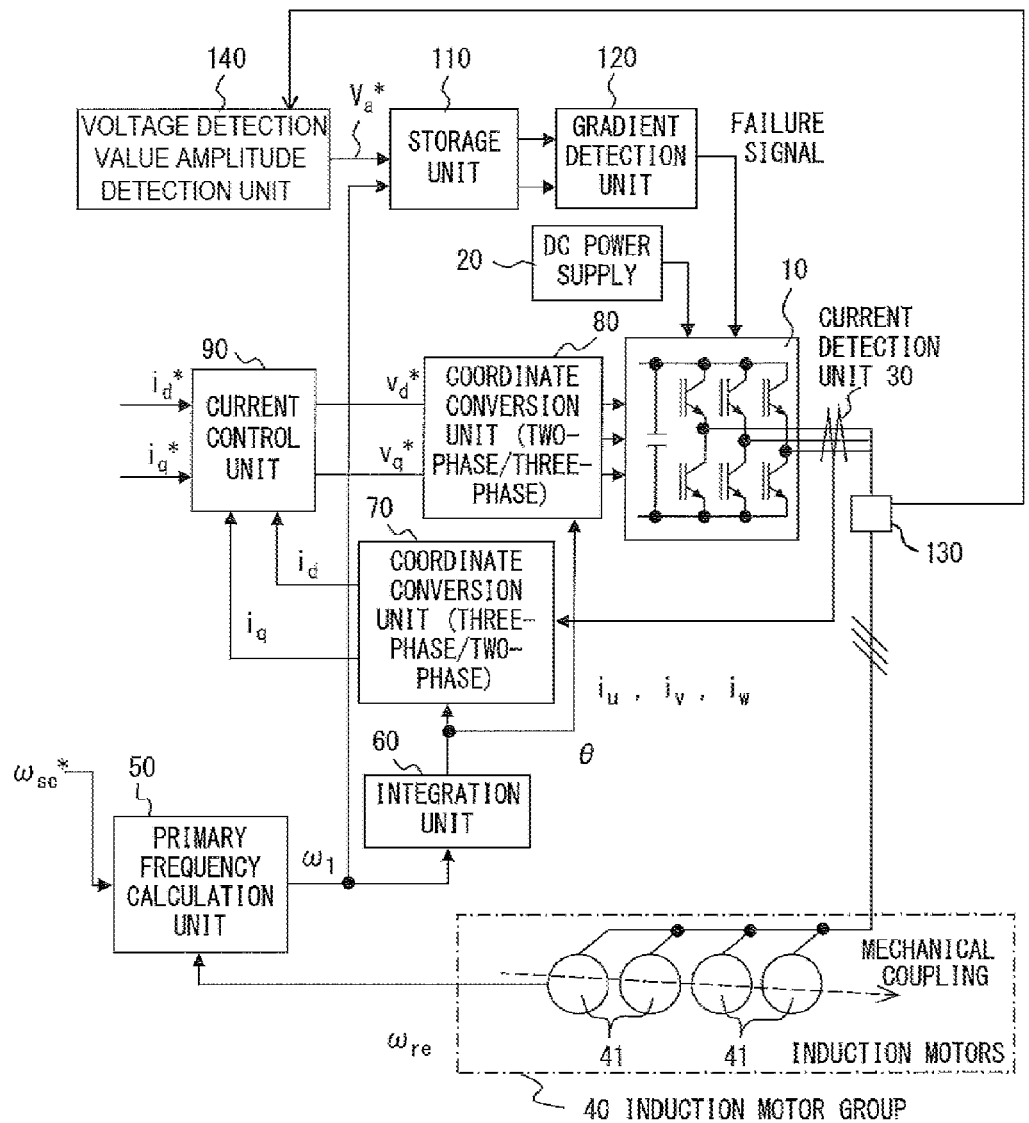
FIG. 1B is a block diagram illustrating a drive system for an induction motor to which an embodiment of the invention is applied.

The amplitude of a voltage command value is used to detect incorrect wiring in the embodiments described above, but the amplitude of a voltage detection value may be used instead. In particular, as illustrated in FIG. 1B, the voltage detection unit 130 detects an output voltage from the power converter 10, and a voltage detection value amplitude calculation unit 140, which is a substitute for voltage command amplitude calculation unit 100 depicted in FIG. 1A, calculates the amplitude of the voltage detection value. In addition, a combination of the amplitude of the voltage detection value and a primary frequency is stored in the storage unit 110.

The gradient detection unit 120 calculates the ratio of an increase in the amplitude of the voltage detection value relative to an increase in the primary frequency, and incorrect wiring of the phase sequence of an induction motor 41 is detected when the ratio has become less than a predetermined reference value.

According to one embodiment of the invention, an electric vehicle includes a plurality of wheel-driving induction motors operated by a power converter such as one variable voltage variable frequency inverter (VVVF inverter) mounted on the vehicle.

During assembly, maintenance, or inspection of the electric vehicle, an electric device and wiring between devices may be removed from, and/or attached to, the vehicle. After the vehicle or electric devices are assembled, a running test may be conducted in which the electric vehicle is started with a power-running notch of one; the vehicle starts at a low velocity and is gradually accelerated. Owing to such a running test, it is possible to check that each electric device can be operated normally. A power-running notch of one is the power running notch of the lowest torque performance.

Accordingly, when the invention is applied to an electric vehicle, it is preferable to detect incorrect wiring of an induction motor 41 while the vehicle is being driven with a power-running notch of one. An arrangement may be made such that incorrect wiring of the induction motor 41 is detected while the vehicle is being driven at a predetermined velocity (e.g., a maximum velocity the vehicle can achieve through acceleration with a power-running notch of one) or less. In addition, an arrangement may be made such that incorrect wiring of the induction motor 41 is detected while the vehicle is being driven with a power-running notch of one at a predetermined velocity or less.

Such configurations allow incorrect wiring of the induction motor 41 to be detected in an early stage after the vehicle or electric devices are assembled.

Figure 9:
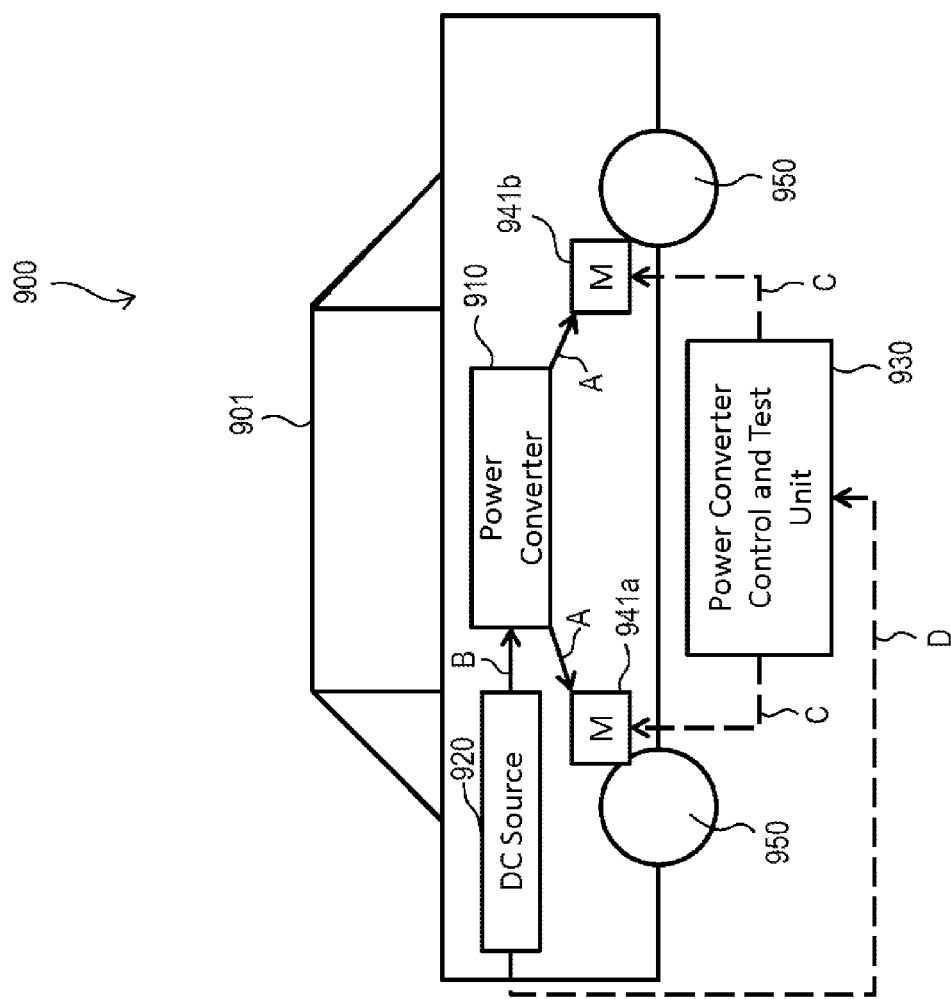
FIG. 9 illustrates a vehicle utilizing a controlling apparatus for a three-phase synchronous motor that includes an incorrect wiring detecting function according to one embodiment of the invention.

FIG. 9 illustrates a vehicle system 900 including a power converter and control test unit according to one embodiment. The vehicle system 900 includes a vehicle 901 having one or more wheel-driving induction motors (M) 941a and 941b driving one or more wheels 950. The wheel-driving induction motors (M) 941a and 941b are driven by a power converter 910 via power transmission paths A. DC power is provided to the power converter 910 from a DC source 920, such as a battery, via power transmission path B.

The system 900 includes a power converter control and test unit 930, corresponding to the system illustrated in FIG. 1A. In one embodiment, power transmission paths A may be disconnected and power transmission paths C and D activated to allow the power converter and control test unit 930 to control and test the wheel-driving induction motors (M) 941a and 941b to detect incorrect wiring.

While the power converter control and test unit 930 is illustrated as being external to the vehicle 901, in some embodiments, the unit 930 may be located inside the vehicle 901.

While one embodiment of the invention is provided by way of example, in which the power converter control system is implemented in an electric vehicle utilizing wheel-driving induction motors to drive one or more wheels or axles, embodiments are not limited to such a vehicle, or to any vehicle. Instead, embodiments include any system utilizing induction motors. In addition, while FIG. 9 appears to show a car, by way of illustration only, embodiments of the invention are not limited to a car, but encompass any vehicle utilizing axle-driving induction motors, such as railway electric vehicles, aircraft, and watercraft.

According to the ratio of an increase in an amplitude of a voltage command value or voltage detection value relative to an increase in a primary frequency, the present invention can reliably detect that a plurality of induction motors connected in parallel to each other and mechanically coupled to each other include at least one induction motor whose phase sequence includes incorrect wiring with respect to a power converter.

What is claimed is:

1. A power converter controlling apparatus, comprising:
a current detection unit configured to detect an output current of a power converter between the power converter and a plurality of induction motors connected in parallel to each other, and mechanically coupled to each other, and configured to output a current detection value based on detecting the output current of the power converter;
a current control unit configured to generate a voltage command value based on the current detection value and a current command value defining a target current value;
a voltage command amplitude calculation unit configured to calculate an amplitude of the voltage command value; and
a gradient detection unit configured to calculate a value corresponding to an increase in the amplitude of the voltage command value divided by an increase in a primary frequency of the induction motors, and configured to output a failure signal upon determining that a result of the division is less than a predetermined reference value.

2. The power converter controlling apparatus of claim 1, further comprising a storage unit configured to store, for each sampling period, a combination of the primary frequency of the induction motors and the amplitude of the voltage command value,
wherein the gradient detection unit is configured to calculate the value based on the primary frequency and amplitude information stored in the storage unit.

3. The power converter controlling apparatus of claim 1, wherein the gradient detection unit is configured to output the failure signal to the power converter to stop operation of the power converter based on determining that the result of the division is less than the predetermined reference value.

4. A power converter controlling apparatus, comprising:
a current detection unit configured to detect an output current of a power converter configured to output a three-phase AC voltage to a plurality of induction motors connected in parallel to each other and mechanically coupled to each other;
a voltage detection unit configured to detect an output voltage of the power converter;
a current control unit configured to generate a voltage command value based on a current detection value provided by the current detection unit and based on a current command value corresponding to a target current value;
a voltage detection value amplitude calculation unit configured to calculate an amplitude of a voltage detection value provided by the voltage detection unit; and
a gradient detection unit configured to calculate a value corresponding to an increase in the amplitude of the voltage command value divided by an increase in a primary frequency of the induction motors, and configured to output a failure signal upon determining that a result of the division is less than a predetermined reference value.

5. The power converter controlling apparatus of claim 4, further comprising a storage unit configured to store, for each sampling period, a combination of the primary frequency of the induction motors and the amplitude of the voltage command value.

6. An electric vehicle, comprising:
a plurality of wheel-driving induction motors;
a DC power supply;
a power converter configured to convert power from the DC power supply into a three-phase AC voltage, and to supply the three-phase AC voltage to the plurality of wheel-driving induction motors; and
a power converter controlling apparatus comprising:
a current detection unit configured to detect an output current of the power converter;
a current control unit configured to generate a voltage command value based on a current detection value provided by the current detection unit and based on a current command value corresponding to a target current value;
an amplitude detection unit configured to detect an amplitude value of one of the voltage command value and a voltage output from the power converter, and
a gradient detection unit configured to calculate a value corresponding to an increase in the amplitude value divided by an increase in a primary frequency of the plurality of wheel-driving induction motors, and configured to output a failure signal upon determining that a result of the division is less than a predetermined reference value.

7. The electric vehicle according to claim 6, wherein the gradient detection unit outputs the failure signal when the vehicle is driven with a power-running notch of a lowest torque performance.

8. The electric vehicle according to claim 6, wherein the gradient detection unit outputs the failure signal when a velocity of the vehicle is equal to or less than a predetermined value.

9. The electric vehicle according to claim 6, wherein the gradient detection unit outputs the failure signal when the vehicle is driven with a power-running notch of a lowest torque performance at a velocity equal to or less than a predetermined value.

10. A power system, comprising:
a plurality of induction motors;
a DC power supply;
a power converter configured to convert power from the DC power supply into a three-phase AC voltage, and to supply the three-phase AC voltage to the plurality of induction motors; and
a power converter controlling apparatus comprising:
a current detection unit configured to detect an output current of the power converter;
a current control unit configured to generate a voltage command value based on a current detection value provided by the current detection unit and based on a current command value corresponding to a target current value;

an amplitude detection unit configured to detect an amplitude value of one of the voltage command value and a voltage output from the power converter, and a gradient detection unit configured to calculate a value corresponding to an increase in the amplitude value divided by an increase in a primary frequency of the plurality of wheel-driving induction motors, and configured to output a failure signal upon determining that a result of the division is less than a predetermined reference value.

11. The power system of claim 10, wherein the plurality of induction motors are connected in parallel and mechanically connected to each other.

* * * * *